(12) United States Patent
Gupta (10) Patent No.: US 7,880,807 B2
(45) Date of Patent: Feb. 1, 2011

(54) CAMERA SYSTEM WITH MIRROR ARRANGEMENT FOR GENERATING SELF-PORTRAIT PANORAMIC PICTURES

(75) Inventor: Vikram M. Gupta, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 478 days.

(21) Appl. No.: 11/964,220

(22) Filed: Dec. 26, 2007

(65) Prior Publication Data

US 2009/0167934 A1 Jul. 2, 2009

(51) Int. Cl.
- H04N 5/225 (2006.01)
- H04N 5/262 (2006.01)
- G02B 27/10 (2006.01)
- G06F 7/04 (2006.01)
- G06F 15/16 (2006.01)
- G06F 17/30 (2006.01)
- H04L 29/06 (2006.01)
- G03B 17/00 (2006.01)

(52) U.S. Cl. .................. 348/373; 348/239; 348/344; 348/343; 726/6; 726/7; 396/72

(58) Field of Classification Search .......... 348/373, 348/239, 344, 343; 726/6, 7; 396/72
See application file for complete search history.

(56) References Cited

U.S. PATENT DOCUMENTS

2003/0053804 A1* 3/2003 Takeshita et al. ............ 396/286

2004/0041935 A1 3/2004 Nagamine et al.
2004/0141071 A1 7/2004 Liu
2004/0263482 A1* 12/2004 Goertz ...................... 345/173

(Continued)

FOREIGN PATENT DOCUMENTS

JP 10268386 10/1998

(Continued)

OTHER PUBLICATIONS

Hanft, Adrian, "Thoughts About Photography", Found Photography, XP002505669, (2006), [Retrieved from the Internet on Nov. 26, 2008], <http://www.foundphotography.com/PhotoThoughts/archives/2006/12/>.

(Continued)

*Primary Examiner*—Sinh Tran
*Assistant Examiner*—Christopher K Peterson
(74) *Attorney, Agent, or Firm*—Renner, Otto, Boisselle & Sklar, LLP (57) ABSTRACT

A camera assembly that generates a high-quality self portrait may include a plurality of reflecting surfaces, such as an array of mirrors or a multi-faceted reflecting element. Each reflecting surface may be arranged so as to assist the user align the camera by rotational movement and/or translated movement to achieve a different field of view for the camera assembly for each reflecting surface. In this manner, the user may sequentially use the various reflecting surfaces to capture an image corresponding to each reflecting surface so that each image corresponds to a different portion of a scene. These portions of the scene may have some overlap and may be stitched together to form a panoramic self portrait that includes the user and portions of the scene behind the user.

15 Claims, 3 Drawing Sheets

U.S. PATENT DOCUMENTS

| | | |
|---|---|---|
| 2005/0008254 A1* | 1/2005 | Ouchi et al. ............... 382/284 |
| 2005/0107117 A1* | 5/2005 | Makino .................. 455/556.1 |
| 2005/0237424 A1 | 10/2005 | Weekamp et al. |
| 2006/0268130 A1* | 11/2006 | Williams et al. ............ 348/239 |
| 2007/0036537 A1* | 2/2007 | You et al. .................. 396/333 |
| 2008/0068452 A1* | 3/2008 | Nakao et al. ................ 348/36 |
| 2008/0111881 A1* | 5/2008 | Gibbs et al. .................. 348/36 |
| 2008/0155674 A1* | 6/2008 | Hong ........................... 726/7 |
| 2009/0061913 A1* | 3/2009 | Woodruff .................. 455/466 |

FOREIGN PATENT DOCUMENTS

| | | |
|---|---|---|
| WO | 2006021824 | 3/2006 |

OTHER PUBLICATIONS

International Search Report and Written Opinion from corresponding International Application No. PCT/US08/68299, Filing Date: Jun. 26, 2008.

International Preliminary Report on Patentability from corresponding International Application No. PCT/US08/68299, Filing date: Jun. 26, 2008.

* cited by examiner

CAMERA SYSTEM WITH MIRROR ARRANGEMENT FOR GENERATING SELF-PORTRAIT PANORAMIC PICTURES

TECHNICAL FIELD OF THE INVENTION

The technology of the present disclosure relates generally to photography and, more particularly, to a camera system that includes a mirror arrangement to assist a user of the camera system in taking a panoramic picture that includes a representation of the user.

BACKGROUND

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras that are capable of capturing still images and video images.

Some camera phones have a small mirror close to the lens of the camera. This mirror is curved (e.g., concave) to increase how much of a scene is visible to a user in a reflection of the mirror. The purpose of the mirror is to assist the user in taking a self portrait. For example, the user may hold the mobile telephone at about arm's length and point the lens toward himself or herself, while aligning the lens by observing his or her reflection in the mirror as an indication of the field of view of the camera assembly. This arrangement is convenient to assist the taking of a "single shot" portrait. But due to the relative proximity of the user to the lens, the user's face generally takes up the majority of the field of view of the camera assembly. As a result, it is difficult to include the user and background objects in the same picture. Also, an autofocus feature of the camera assembly will tend to adjust focus of the camera assembly for the distance of the user to the camera assembly. As a result, background objects may appear out of focus in the resulting picture.

SUMMARY

To improve the ability to generate a high-quality self portrait with a camera assembly, the present disclosure describes an improved camera assembly. The improved camera assembly includes a plurality of reflecting surfaces, such as an array of mirrors or a multi-faceted reflecting element. Each reflecting surface may be arranged so as to assist the user align the camera by rotational movement and/or translated movement to achieve a different field of view for the camera assembly for each reflecting surface. In this manner, the user may sequentially use the various reflecting surfaces to capture an image corresponding to each reflecting surface so that each image corresponds to a different portion of the scene. These portions of the scene may have some overlap and may be stitched together to form a panoramic self portrait that includes the user and portions of the scene behind the user.

According to one aspect of the disclosure, a camera assembly includes a sensor that generates digital image data for capturing images, each image representing a portion of a scene that is in a field of view of the camera assembly at the time that the image was captured; a housing in which the sensor is contained; and a plurality of reflecting surfaces retained by the housing and arranged with respect to each other such that a user of the camera assembly aligns the camera assembly while observing reflections from each reflecting surface to compose and capture an image corresponding to each reflecting surface so that the captured images, when stitched together to form a panoramic image of the scene, contiguously represents a portion of the scene that includes a representation of the user and is larger than the portion of the scene represented by any one of the captured images.

According to one embodiment, the camera assembly further includes a controller that stitches the images together to form the panoramic image that includes the representation of the user.

According to one embodiment of the camera assembly, each reflecting surface has an identifier and each image is displayed on a display of the camera assembly with an identifier corresponding to the identifier of the reflecting surface that corresponds to the image.

According to one embodiment of the camera assembly, the controller is configured to allow the user to replace or approve a user selected one of the images prior to stitching of the images.

According to one embodiment of the camera assembly, at least some of the reflecting surfaces have an alignment marking to guide the user in composing the image that corresponds to the reflecting surface.

According to one embodiment of the camera assembly, the reflecting surfaces include a first reflecting surface that is in a plane normal to an optical axis of the camera assembly so that an image field of the camera assembly is generally centered on the user when the user centers the reflection from the first reflecting surface on the user.

According to one embodiment of the camera assembly, the reflecting surfaces include a second reflecting surface that is at an angle to the first reflecting surface so that at least one of rotation or translation of the camera assembly results in the user seeing at least a part of the user in the reflection from the second reflecting surface and so that the field of view of the camera assembly in the rotated or translated position overlaps with the field of view of the camera assembly corresponding to the centered portion associated with the first reflecting surface.

According to one embodiment, the camera assembly further includes a display that acts as an electronic viewfinder during composition of each image.

According to one embodiment of the camera assembly, the display is on an opposite side of the housing from a side of the housing that retains the reflecting surfaces.

According to one embodiment, the camera assembly further includes a second camera assembly adjacent the display.

According to one embodiment, the camera assembly further includes a shutter release button on the side of the housing that retains the reflecting surfaces.

According to one embodiment, the camera assembly further includes one or more indicators associated with the reflecting surfaces that prompts the user to compose an image with a specified one of the reflecting surfaces.

According to one embodiment of the camera assembly, the reflecting surfaces are touch sensitive to function as devices for receiving user input regarding which reflecting surface is being used to compose an image.

According to one embodiment, the camera assembly further includes call circuitry for establishing a call over a network.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Embodiments will now be described with reference to the drawings, wherein like reference numerals are used to refer to like elements throughout. It will be understood that the figures are not necessarily to scale.

Described below in conjunction with the appended figures are various embodiments of an improved camera system and method of camera operation. In the illustrated embodiments, the camera system is embodied as a digital camera assembly that is made part of a mobile telephone. It will be appreciated that aspects of the camera system may be applied to other operational contexts such as, but not limited to, a dedicated camera or another type of electronic device that has a camera (e.g., a personal digital assistant (PDA), a media player, a gaming device, a "web" camera, a computer, etc.). The camera assembly may be used to capture image data in the form of still images, also referred to as pictures and photographs, but it will be understood that the camera assembly may be capable of capturing video images in addition to still images.

Figure 1:
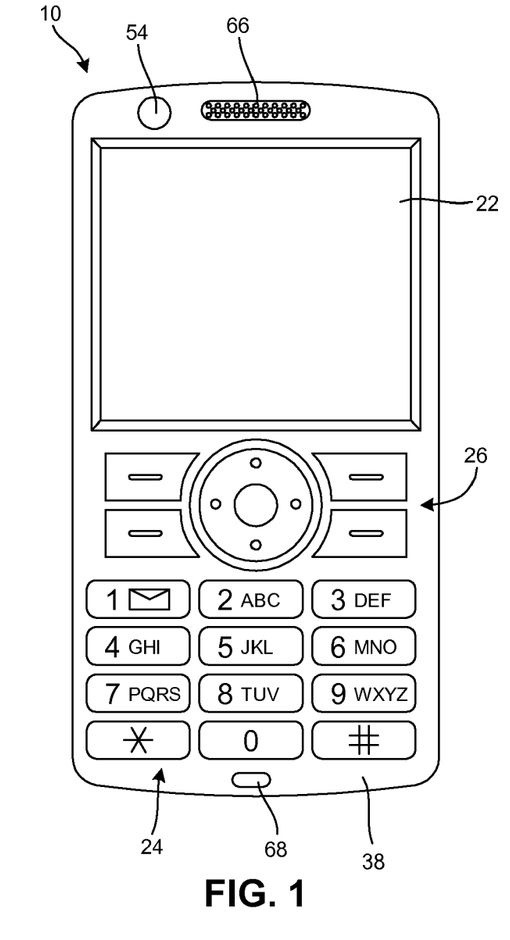
FIGS. 1 and 2 are respectively a front view and a rear view of an exemplary electronic device that includes a representative camera assembly with a first exemplary mirror arrangement.
Figure 2:
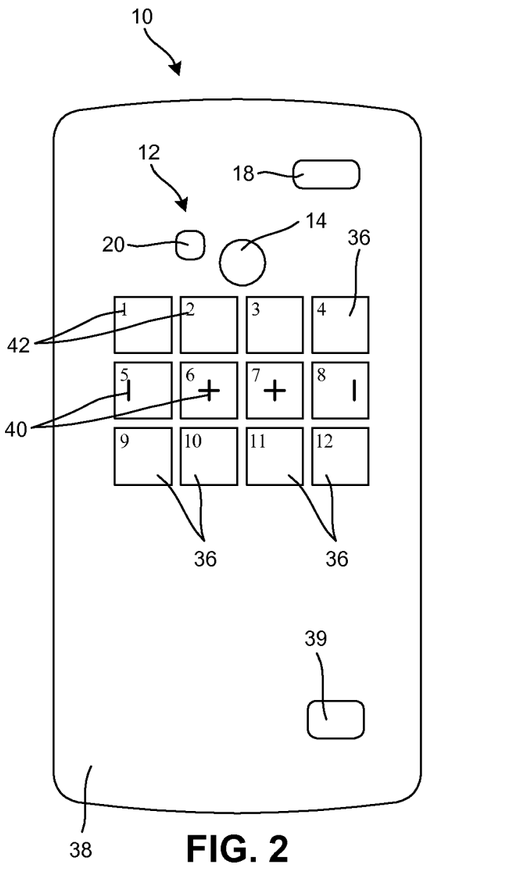
Figure 3:
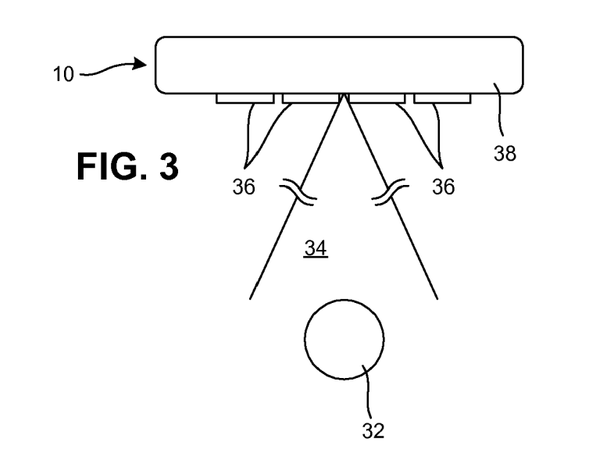
FIG. 3 is a top view of the exemplary electronic device of FIG. 1 when positioned in front of a user.

Referring initially to FIGS. 1 through 3, an electronic device 10 is shown. The illustrated electronic device 10 is a mobile telephone. The electronic device 10 includes a camera assembly 12 for taking digital still pictures and/or digital video clips. It is emphasized that the electronic device 10 need not be a mobile telephone, but could be a dedicated camera or some other device as indicated above With additional reference to FIG. 4, the camera assembly 12 may be arranged as a typical camera assembly that includes imaging optics 14 to focus light from a scene within the field of view of the camera assembly 12 onto a sensor 16. The sensor 16 converts the incident light into image data. The imaging optics 14 may include various optical components, such as a lens assembly and components that supplement the lens assembly (e.g., a protective window, a filter, a prism, and/or a mirror). The imaging optics 14 may be associated with focusing mechanics, focusing control electronics (e.g., a multi-zone autofocus assembly), optical zooming mechanics, etc. Other camera assembly 12 components may include a flash 18 to provide supplemental light during the capture of image data for a photograph, a light meter 20, a display 22 for functioning as an electronic viewfinder and as part of an interactive user interface, a keypad 24 and/or buttons 26 for accepting user inputs, an optical viewfinder (not shown), and any other components commonly associated with cameras. One of the keys from the keypad 24 or one of the buttons 26 may be a shutter key that the user may depress to command the taking of a photograph.

Figure 4:
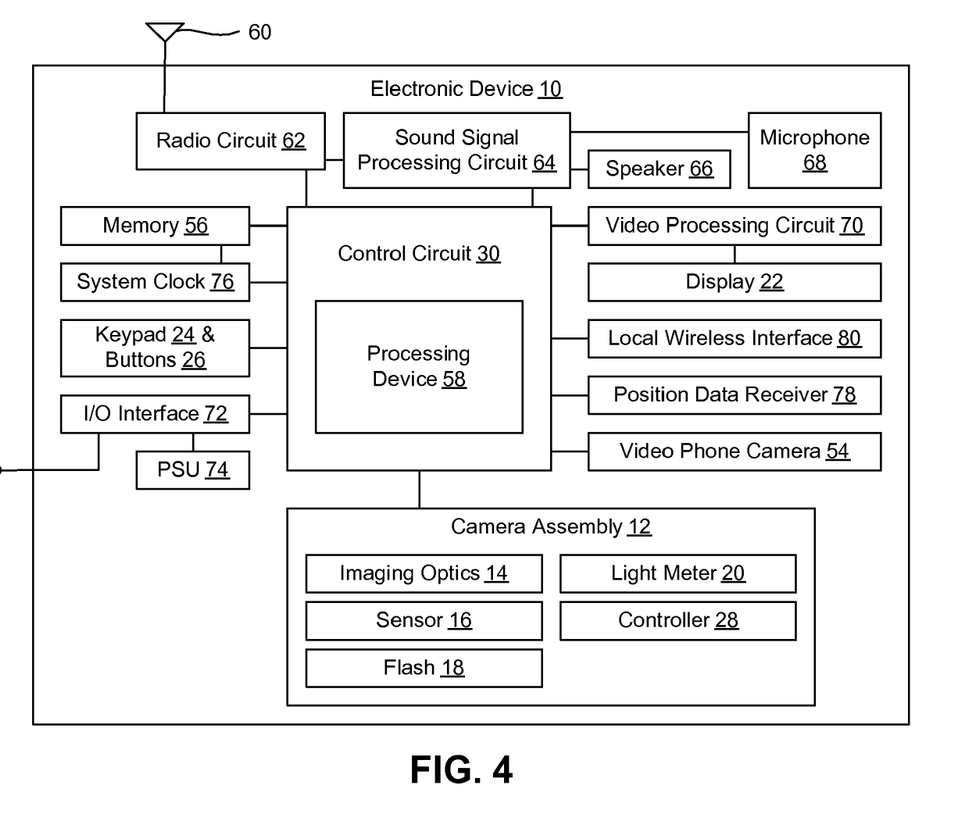
FIG. 4 is a schematic block diagram of the exemplary electronic device of FIGS. 1 through 3.

Another component of the camera assembly 12 may be an electronic controller 28 that controls operation of the camera assembly 12. The controller 28 may be embodied, for example, as a processor that executes logical instructions that are stored by an associated memory, as firmware, as an arrangement of dedicated circuit components or as a combination of these embodiments. Thus, methods of operating the camera assembly 12 may be physically embodied as executable code (e.g., software) that is stored on a machine readable medium or may be physically embodied as part of an electrical circuit. In another embodiment, the functions of the electronic controller 28 may be carried out by a control circuit 30 that is responsible for overall operation of the electronic device 10. In this case, the controller 28 may be omitted. In another embodiment, camera assembly 12 control functions may be distributed between the controller 28 and the control circuit 30.

It will be understood that the sensor 16 may capture data at a predetermined frame rate to generate a preview video signal that is supplied to the display 22 for operation as an electronic viewfinder. Typically, the display 22 is on an opposite side of the electronic device 10 from the imaging optics 14. In this manner, a user 32 may point the camera assembly 12 in a desired direction and view a representation of the field of view 34 of the camera assembly 12 on the display 22. But if the electronic device 10 were turned so that the user 32 is in the field of view 34 of the camera assembly, then the display 22 may not be visible to the user 32.

To assist the user 32 in composing a panoramic picture in which the user 32 appears, the camera assembly 12 may include a plurality of reflecting surfaces 36 on a surface of a housing 38 of the electronic device 10. In the illustrated embodiment, each reflecting surface 36 is an individual unit. In another embodiment, the reflecting surfaces 36 may be distinct portions of a single reflecting unit, such as a multi-faceted mirror. The reflecting surfaces 36 may have any suitable construction, such as a mirror that is made from a translucent material such as glass or plastic that has a rear surface that has been coated with a reflecting film. Other exemplary implementations of the reflecting surfaces 36 include, for example, a polished piece of metal, a substrate that has been coated with a material layer or a stack of material layers to impart reflecting properties, a prism, and so forth.

In the illustrated embodiment, each reflecting surface 36 is depicted as being generally square and as being planar (e.g., flat) with respect to an optical axis of the camera assembly 12. It will be appreciated that the reflecting surfaces 36 may have other physical features, and each reflecting surface 36 may have the same physical features or physical features that differ from other reflecting surfaces 36. For instance, one or more of the reflecting surfaces 36 may be rectangular, may have rounded corners, may be circular, may be oval, or may have some other shape. Also, one or more of the reflecting surfaces 36 may be non-planer (e.g., a convex curve). As another example, one or more of the reflecting surfaces 36 may be perpendicular to the optical axis of the camera assembly 12 and/or one or more of the reflecting surfaces 36 may be "tilted" so as to be disposed at a non-perpendicular angle to the optical axis of the camera assembly 12. Also, the relative sizes of the reflecting surfaces 36 may be varied and/or the spacing between the reflecting surfaces 36 may be varied.

The reflecting surfaces 36 depicted in FIG. 2 are arranged in a grid (e.g., matrix) having three rows and four columns. In other embodiments there may be a different number of rows and/or a different number of columns. For instance, there may be one row of reflecting surfaces having two or more reflecting surfaces 36. In other embodiments, the rows and/or columns may be offset with respect to each other so that adjacent reflecting surfaces 36 are staggered. In the embodiment of FIG. 2, a vertical center line drawn through the most exterior optical element 14 falls between the reflecting surfaces 36. In another embodiment, and as illustrated in the embodiment of FIGS. 6 through 9, a vertical center line drawn through the most exterior optical element 14 may bisect one or more of the reflecting surfaces 36. It will be further appreciated that the reflecting surfaces 36 may be arranged in another manner, such as a circle or oval of reflecting surfaces 36, a circle or oval of reflecting surfaces that surround one or more central reflecting surfaces 36, concentric circles of reflecting surfaces 36, etc.

In the illustrated embodiments, the reflecting surfaces 36 extend outward from the housing 38. In other embodiments, the reflecting surfaces 36 may be recessed into the housing 38 or mounted to be flush with the housing. For purposes of clarity, optical components of the camera assembly 12 have not been shown in the various top views (e.g., FIGS. 3 and 6 through 9), but it is possible that an optical component or housing for an optical component may extend beyond the housing 38 of the electronic device 10.

The user may take a series of images with the camera assembly 12 that are stitched together using image stitching software to form a composite image. Image stitching software is known in the art and will not be described in detail. Each image may be captured while the user views a reflection in one of the reflecting surfaces 36 that corresponds to the desired image. For example, the user may observe his or her reflection in a first one of the reflecting surfaces 36 and take a corresponding image by depressing a shutter release key. The shutter release key may form part of the keypad 24 or the buttons 26, as indicated above. For convenience during the taking of a self portrait, a second shutter release key 39 may be placed on the side of the electronic device 10 with the reflecting surfaces 36.

After taking the first photograph, the user may move the camera assembly 12 by rotating the electronic device 10 (e.g., so that the direction of the optical axis of the camera assembly 12 turns) and/or moving the electronic device 10 in a translated-type motion (e.g., so that the optical axis of the camera assembly 12 shifts but remains generally parallel to its prior direction). Then, the user may observe a reflection in another of the reflecting surfaces 36 and take a second photograph. This process may continue until the user has taken pictures using a desired number of the reflecting surfaces. Thereafter, the photographs may be stitched together to form a panoramic picture that includes the user. Each image may be taken so that the field of view of the camera assembly 12 contains a different portion of the scene. Also, the portion of the panoramic image representing the user may come from one or more of the images and the portion of the panoramic image representing the background may come from one or more of the images that are the same as and/or different than the image(s) from which the representation of the use is derived. In this manner, a greater amount of the background may be represented in the panoramic image than if the self-portrait were generated from one image that the user composed using his or her reflection in one mirror. Also, the images may be taken with different focal lengths (e.g., different focus settings), which may lead to a greater amount of the composite panoramic self-portrait being in focus compared to the conventional single image self-portrait.

In one embodiment, one or more of the reflecting surfaces 36 may include a visual guide, such as an alignment mark 40, for assisting the user align the reflection surface 36 to compose a corresponding image. The alignment marks 40 may provide guidance and feedback to the user 32 to demonstrate how much shift and/or rotation of the electronic device 10 is appropriate between adjacent images so that, in the aggregate, multiple images may be successfully stitched together to form a panoramic view that includes the user. Some overlap to the images corresponding to adjacent reflecting surfaces 36 would be desirable in most embodiments. It is noted that it may be best for the user to remain as still as possible (including avoiding turning of the user's head) during the taking of the various images in which the user 32 or a part of the user 32 appears.

As an example of the possible arrangement of alignment marks 40, in the illustrated embodiment of FIG. 2, some of the reflecting surfaces 36 include cross-hairs and, when composing an image corresponding to the reflecting surfaces 36 that have cross-hairs, the user 32 may align his or her reflection so that the cross-hairs overlap with the user's nose or other facial feature. Another one of the reflecting surfaces 36 has a vertical alignment mark on a left hand side of the reflecting surface 36. This alignment mark 40 may guide the user 32 to align his or her right eye or right ear with the alignment mark 40. Similarly, another one of the reflecting surfaces 36 has a vertical alignment mark on a right hand side of the reflecting surface 36. This alignment mark 40 may guide the user 32 to align his or her left eye or left ear with the alignment mark 40.

In another embodiment, the reflecting surfaces 36 may each have a number of other identifier 42. In the embodiment of FIG. 2, the reflecting surfaces 36 are numbered using the numbers one through twelve. After taking images using the reflections of the reflecting surfaces 36 to compose the images, the images may be displayed on the display 22. The user may evaluate if the images appear to have some overlap and/or desired qualities in terms of exposure, focus, content, etc. that would contribute to a quality composite panoramic self-portrait. The images may be displayed with the corresponding identifier (e.g., with the identifier superimposed on the image) so that if the user does not like a particular image from the series of images, the user may retake the picture by using the reflection from the reflecting surface 36 that has the correspond identifier 42. The plural images may be displayed all at the same time, a few at a time or one at time, and the images may be displayed in a layout that corresponds to the layout of the reflecting surfaces 36. In one embodiment, the user may scroll through screens that arrange the individual images in a layout that corresponds to the layout of the reflecting surfaces 36. For example, a user interface of the electronic device 10 may guide the user through the images and allow the user to edit or repeat the taking of one or more of the images. Once the user approves the images, the images may be stitched together to form the composite panoramic image.

In one embodiment, the electronic device 10 may guide the user to capture a series of images that correspond to each of the reflecting surfaces 36. In this manner, the user may be less likely to "forget" to capture an image with one or more of the reflecting surfaces. In one embodiment, there may be a visual indicator associated with each reflecting surface 36. For example, the visual indicator may be an LED that illuminates to guide the user as to which reflecting surface 36 to use to compose the next image. In another embodiment, a display may be present to show the value of the reflecting surface identifier 42 that the user should use next.

In one embodiment, the user may communicate the identity of the reflecting surface 36 that he or she intends to use to compose the next image to the electronic device 10. For example, each reflecting surface 36 may be touch sensitive and the user may press the reflecting surface 36 to communicate the identity of the reflecting surface 36 that is being used to compose a corresponding image. Also, this type of input function may allow the user to repeat the capturing of an image and, in response, the camera assembly 12 may replace a previously captured image that is associated with the user-indicated reflecting surface 36.

Figure 6:
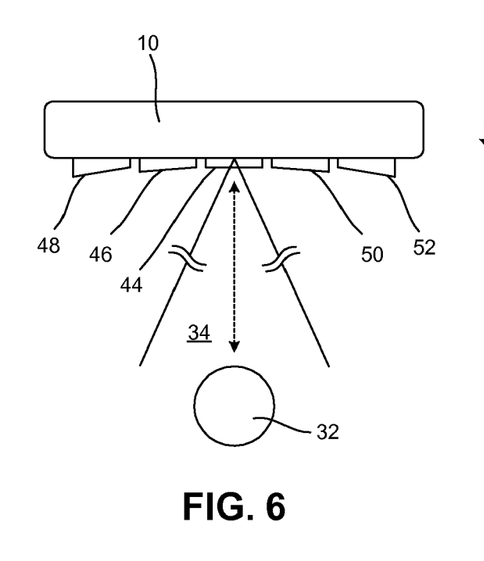
FIG. 6 is a top view of another exemplary electronic device that includes a representative camera assembly with a second exemplary mirror arrangement.
Figure 7:
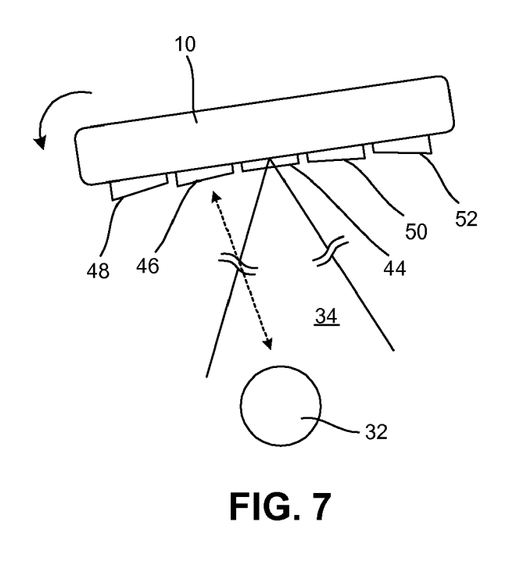
FIG. 7 is a top view of the exemplary electronic device of FIG. 6 where the electronic device is rotated with respect to the position of the electronic device of FIG. 6.

Turning to the embodiment of FIGS. 6 and 7, a row of five reflecting surfaces 36 are present. For convenience, these reflecting surfaces will be referred to as a central reflecting surface 44, a middle left hand reflecting surface 46, an extreme left hand reflecting surface 48, a middle right hand reflecting surface 50, and an extreme right hand reflecting surface 52. It will be appreciated that a different number or arrangement of reflecting surfaces 36 are possible. In this embodiment, the central reflecting surface 44 is in a plane that this generally normal (i.e., perpendicular) to the optical axis of the camera assembly 12. The central reflecting surface 44 may be used to capture an image of the user while generally centering the user 32 in the field of view of the camera assembly 12.

The other reflecting surfaces 46 through 52 may be tilted relative to the central reflecting surface 44. For instance, directions normal to planes of by the reflecting surfaces 46 through 52 may converge toward the optical axis. An amount of the tilt may increase the further the reflecting surface 46 is positioned from the optical axis of the camera assembly 12. Therefore, the amount of tilt of the reflecting surface 48 may be greater than the amount of tilt of the reflecting surface 46. Similarly, the amount of tilt of the reflecting surface 52 may be greater than the amount of tilt of the reflecting surface 50. The angle between the direction normal to each of the reflecting surfaces 46 through 52 and the optical axis of the camera assembly 12 may be selected to assist the user align the camera assembly by rotating the electronic device 10 about an axis as depicted in FIG. 7. In another embodiment, the outlying reflecting surfaces 46 through 52 may not be tilted relative to the central reflecting surface 44. In one embodiment, the user 32 may strive to maintain the position (including rotation) of the user's head when using the reflections of the reflecting surfaces 46 through 52 relative to the position of the user's head when using the reflection of the central reflecting surface 44. Dashed arrows in FIGS. 6 and 7 represent the focus of the user's gaze and, therefore, indicate which reflecting surface 36 that the user is observing. The solid arrow in FIG. 7 represents movement of the electronic device 10 relative to the position of the electronic device 10 in FIG. 6.

In the exemplary illustration of FIG. 7, the user has selected to capture an image that is composed while viewing the reflection of the middle left hand reflecting surface 46. Relative to the position of FIG. 6 used to capture an image corresponding to the reflection of the central reflecting surface 44, the user 32 may rotate the electronic device 10 so as to be able to view himself or herself in the reflecting surface 46. This rotation changes the portion of the scene that is in the field of view 34 of the camera assembly 12, but the inclination of the reflecting surface 46 relative to the central reflecting surface 44 may be selected to achieve an overlap between an image captured when the user sees himself or herself in the reflection from the reflecting surface 46 and an image captured when the user sees himself or herself in the reflection from the central reflecting surface 44. Further rotation of the electronic device may allow the user to capture an image using the reflection of the extreme left hand reflecting surface 48 that overlaps with the image captured using the reflection of the middle left hand reflecting 46. With each progressive counterclockwise rotation of the electronic device 10, portions of the scene behind and to the right of the user 32 may be captured in the corresponding images. Rotation in the opposite direction (the clockwise direction) may result in the capturing of similar images, but to the left of the user 32, using the reflections from the reflecting surfaces 50 and 52.

Figure 8:
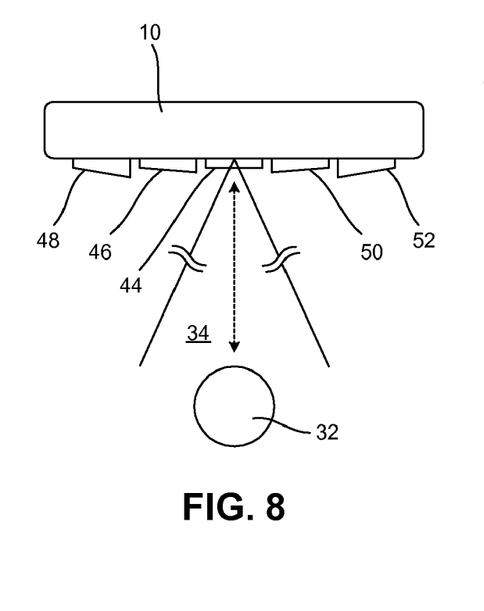
FIG. 8 is a top view of another exemplary electronic device that includes a representative camera assembly with a third exemplary mirror arrangement.
Figure 9:
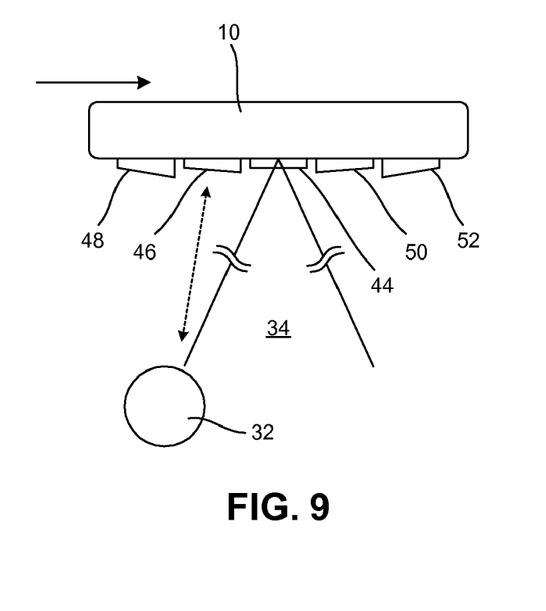
FIG. 9 is a top view of the exemplary electronic device of FIG. 8 where the electronic device is shifted in position with respect to the position of the electronic device of FIG. 8.

Turning to the embodiment of FIGS. 8 and 9, a row of five reflecting surfaces 36 are present. For convenience, these reflecting surfaces will be referred to in the same manner as the reflecting surfaces of the embodiment of FIGS. 6 and 7, including the central reflecting surface 44, the middle left hand reflecting surface 46, the extreme left hand reflecting surface 48, the middle right hand reflecting surface 50, and the extreme right hand reflecting surface 52. It will be appreciated that a different number or arrangement of reflecting surfaces 36 are possible. In this embodiment, the central reflecting surface 44 is in a plane that this generally normal (i.e., perpendicular) to the optical axis of the camera assembly 12. The central reflecting surface 44 may be used to capture an image of the user while generally centering the user 32 in the field of view of the camera assembly 12.

The other reflecting surfaces 46 through 52 may be tilted relative to the central reflecting surface 44. For instance, directions normal to planes of by the reflecting surfaces 46 through 52 may diverge with the optical axis. An amount of the tilt may increase the further the reflecting surface 46 is positioned from the optical axis of the camera assembly 12. Therefore, the amount of tilt of the reflecting surface 48 may be greater than the amount of tilt of the reflecting surface 46. Similarly, the amount of tilt of the reflecting surface 52 may be greater than the amount of tilt of the reflecting surface 50. The angle between the direction normal to each of the reflecting surfaces 46 through 52 and the optical axis of the camera assembly 12 may be selected to assist the user align the camera assembly by translating the electronic device 10 along the plane of the central reflecting surface 44 as depicted in FIG. 9. In another embodiment, the outlying reflecting surfaces 46 through 52 may not be tilted relative to the central reflecting surface 44. In one embodiment, the user 32 may strive to maintain the position (including rotation) of the user's head when using the reflections of the reflecting surfaces 46 through 52 relative to the position of the user's head when using the reflection of the central reflecting surface 44. Dashed arrows in FIGS. 8 and 9 represent the focus of the user's gaze and, therefore, indicate which reflecting surface 36 that the user is observing. The solid arrow in FIG. 9 represents movement of the electronic device 10 relative to the position of the electronic device 10 in FIG. 8.

In the exemplary illustration of FIG. 9, the user has selected to capture an image that is composed while viewing the reflection of the middle left hand reflecting surface 46. Relative to the position of FIG. 8 used to capture an image corresponding to the reflection of the central reflecting surface 44, the user 32 may translate the electronic device 10 so as to be able to view himself or herself in the reflecting surface 46. In the illustrated embodiment, this lateral motion changes the portion of the scene that is in the field of view 34 of the camera assembly 12, but the inclination of the reflecting surface 46 relative to the central reflecting surface 44 may be selected to achieve an overlap between an image captured when the user sees himself or herself in the reflection from the reflecting surface 46 and an image captured when the user sees himself or herself in the reflection from the central reflecting surface 44. Further translating movement of the electronic device may allow the user to capture an image using the reflection of the extreme left hand reflecting surface 48 that overlaps with the image captured using the reflection of the middle left hand reflecting 46. With each progressive movement of the electronic device 10 to the right of the user 32, portions of the scene behind and to the right of the user 32 may be captured in the corresponding images. Movement in the opposite direction (to the left of the user) may result in the capturing of similar images, but to the left of the user 32, using the reflections from the reflecting surfaces 50 and 52.

With respect the embodiments of either of FIG. 6 or FIG. 8, angled reflecting surfaces 36 may be arranged above and/or below one or more of the reflecting surfaces 44 through 52 so that pivoting of the top and/or bottom of the electronic and/or vertical translation may capture additional portions of the scene. These movements may be combined with the rotation described in conjunction with FIG. 7 and/or the horizontal translation described in conjunction with FIG. 9.

In addition to the camera assembly 12 and associated plurality of reflecting surfaces 12, the electronic device 10 may include a second camera assembly 54 (FIGS. 1 and 4) that has a field of view that is generally opposite the field of view of the camera assembly 12. The second camera assembly 54 may be arranged to facilitate video telephone calls (also referred to as video telephony). In addition to or instead of the reflecting surfaces 36 that are present in connection with the camera assembly, reflecting surfaces may be arranged with respect to the second camera assembly 54 to facilitate the generation of a panoramic self portrait from the combination of multiple images that are captured with the second camera assembly 54.

As indicated, the electronic device 10 of the illustrated embodiments is a mobile telephone. Features of the electronic device 10, when implemented as a mobile telephone, will be described with additional reference to FIG. 4. The electronic device 10 is shown as having a "brick" or "block" form factor housing, but it will be appreciated that other housing types may be utilized, such as a "flip-open" form factor (e.g., a "clamshell" housing), a slide-type form factor (e.g., a "slider" housing) or a pivot-type (e.g., swivel) form factor.

As indicated, the electronic device 10 may include the display 22. The display 22 displays information to a user such as operating state, time, telephone numbers, contact information, various menus, etc., that enable the user to utilize the various features of the electronic device 10. The display 22 also may be used to visually display content received by the electronic device 10 and/or retrieved from a memory 56 of the electronic device 10. The display 22 may be used to present images, video and other graphics to the user, such as photographs, mobile television content and video associated with games.

The keypad 24 and/or buttons 26 may provide for a variety of user input operations. For example, the keypad 24 may include alphanumeric keys for allowing entry of alphanumeric information such as telephone numbers, phone lists, contact information, notes, text, etc. In addition, the keypad 24 and/or buttons 26 may include special function keys such as a "call send" key for initiating or answering a call, and a "call end" key for ending or "hanging up" a call. Special function keys also may include menu navigation and select keys to facilitate navigating through a menu displayed on the display 22. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, etc. Keys or key-like functionality also may be embodied as a touch screen associated with the display 22. Also, the display 22 and keypad 24 and/or buttons 26 may be used in conjunction with one another to implement soft key functionality. As such, the display 22, the keypad 24 and/or the buttons 26 may be used to control the camera assembly 12.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, signaling audio, signaling video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 56, executing applications to allow user interaction with the data, displaying video and/or image content associated with the data, outputting audio sounds associated with the data, and so forth.

The electronic device 10 may include the primary control circuit 30 that is configured to carry out overall control of the functions and operations of the electronic device 10. As indicated, the control circuit 30 may be responsible for controlling the camera assembly 12, including the generation of a panoramic self portrait from plural images using, for example, an image stitching routine.

The control circuit 30 may include a processing device 58, such as a central processing unit (CPU), microcontroller or microprocessor. The processing device 58 may execute code that implements the various functions of the electronic device 10. The code may be stored in a memory (not shown) within the control circuit 30 and/or in a separate memory, such as the memory 56, in order to carry out operation of the electronic device 10. It will be apparent to a person having ordinary skill in the art of computer programming, and specifically in application programming for mobile telephones or other electronic devices, how to program a electronic device 10 to operate and carry out various logical functions.

Among other data storage responsibilities, the memory 56 may be used to store photographs and/or video clips that are captured by the camera assembly 12. Alternatively, the images may be stored in a separate memory. The memory 56 may be, for example, one or more of a buffer, a flash memory, a hard drive, a removable media, a volatile memory, a non-volatile memory, a random access memory (RAM), or other suitable device. In a typical arrangement, the memory 56 may include a non-volatile memory (e.g., a NAND or NOR architecture flash memory) for long term data storage and a volatile memory that functions as system memory for the control circuit 30. The volatile memory may be a RAM implemented with synchronous dynamic random access memory (SDRAM), for example. The memory 56 may exchange data with the control circuit 30 over a data bus. Accompanying control lines and an address bus between the memory 56 and the control circuit 30 also may be present.

Continuing to refer to FIGS. 1 through 4, the electronic device 10 includes an antenna 60 coupled to a radio circuit 62. The radio circuit 62 includes a radio frequency transmitter and receiver for transmitting and receiving signals via the antenna 60. The radio circuit 62 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 60 and the radio circuit 62 may represent one or more than one radio transceivers.

The electronic device 10 further includes a sound signal processing circuit 64 for processing audio signals transmitted by and received from the radio circuit 62. Coupled to the sound processing circuit 64 are a speaker 66 and a microphone 68 that enable a user to listen and speak via the electronic device 10 as is conventional. The radio circuit 62 and sound processing circuit 64 are each coupled to the control circuit 30 so as to carry out overall operation. Audio data may be passed from the control circuit 30 to the sound signal processing circuit 64 for playback to the user. The audio data may include, for example, audio data from an audio file stored by the memory 56 and retrieved by the control circuit 30, or received audio data such as in the form of signaling audio data from a mobile radio service. The sound processing circuit 64 may include any appropriate buffers, decoders, amplifiers and so forth.

The display 22 may be coupled to the control circuit 30 by a video processing circuit 70 that converts video data to a video signal used to drive the display 22. The video processing circuit 70 may include any appropriate buffers, decoders, video data processors and so forth. The video data may be generated by the control circuit 30, retrieved from a video file that is stored in the memory 56, derived from an incoming video data signal that is received by the radio circuit 62 or obtained by any other suitable method. Also, the video data may be generated by the camera assembly 12 (e.g., such as a preview video signal to provide a viewfinder function for the camera assembly 12).

The electronic device 10 may further include one or more I/O interface(s) 72. The I/O interface(s) 72 may be in the form of typical mobile telephone I/O interfaces and may include one or more electrical connectors. As is typical, the I/O interface(s) 72 may be used to couple the electronic device 10 to a battery charger to charge a battery of a power supply unit (PSU) 74 within the electronic device 10. In addition, or in the alternative, the I/O interface(s) 72 may serve to connect the electronic device 10 to a headset assembly (e.g., a personal handsfree (PHF) device) that has a wired interface with the electronic device 10. Further, the I/O interface(s) 72 may serve to connect the electronic device 10 to a personal computer or other device via a data cable for the exchange of data. The electronic device 10 may receive operating power via the I/O interface(s) 72 when connected to a vehicle power adapter or an electricity outlet power adapter. The PSU 74 may supply power to operate the electronic device 10 in the absence of an external power source.

The electronic device 10 also may include a system clock 76 for clocking the various components of the electronic device 10, such as the control circuit 30 and the memory 56.

The electronic device 10 also may include a position data receiver 78, such as a global positioning system (GPS) receiver, Galileo satellite system receiver or the like. The position data receiver 78 may be involved in determining the location of the electronic device 10.

The electronic device 10 also may include a local wireless interface 80, such as an infrared transceiver and/or an RF interface (e.g., a Bluetooth interface), for establishing communication with an accessory, another mobile radio terminal, a computer or another device. For example, the local wireless interface 80 may operatively couple the electronic device 10 to a headset assembly (e.g., a PHF device) in an embodiment where the headset assembly has a corresponding wireless interface.

Figure 5:
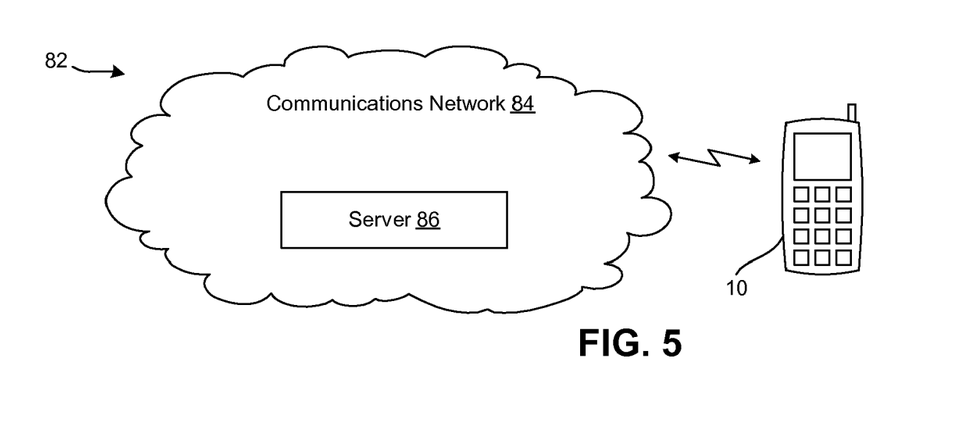
FIG. 5 is a schematic diagram of a communications system in which the electronic device may operate.

With additional reference to FIG. 5, the electronic device 10 may be configured to operate as part of a communications system 82. The system 82 may include a communications network 84 having a server 86 (or servers) for managing calls placed by and destined to the electronic device 10, transmitting data to the electronic device 10 and carrying out any other support functions. The server 86 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 84 may support the communications activity of multiple electronic devices 10 and other types of end user devices. As will be appreciated, the server 86 may be configured as a typical computer system used to carry out server functions and may include a processor configured to execute software containing logical instructions that embody the functions of the server 86 and a memory to store such software.

Although certain embodiments have been shown and described, it is understood that equivalents and modifications falling within the scope of the appended claims will occur to others who are skilled in the art upon the reading and understanding of this specification.

What is claimed is:

1. A camera assembly, comprising:
   a sensor that generates digital image data for capturing images, each image representing a portion of a scene that is in a field of view of the camera assembly at the time that the image was captured;
   a housing in which the sensor is contained; and
   a plurality of reflecting surfaces retained by the housing and arranged with respect to each other such that a user of the camera assembly aligns the camera assembly while observing reflections of the scene in each reflecting surface to compose and capture an image corresponding to each reflecting surface so that the captured images, when stitched together to form a panoramic image of the scene, contiguously represents a portion of the scene that includes a representation of the user and is larger than the portion of the scene represented by any one of the captured images; and wherein each reflecting surface is an individual unit with spacing between the reflecting surfaces.

2. The camera assembly of claim 1, further comprising a controller that stitches the images together to form the panoramic image that includes the representation of the user.

3. The camera assembly of claim 2, wherein each reflecting surface has an identifier and each image is displayed on a display of the camera assembly with an identifier corresponding to the identifier of the reflecting surface that corresponds to the image.

4. The camera assembly of claim 3, wherein the controller is configured to allow the user to replace or approve a user selected one of the images prior to stitching of the images.

5. The camera assembly of claim 1, wherein at least some of the reflecting surfaces have an alignment marking to guide the user in composing the image that corresponds to the reflecting surface.

6. The camera assembly of claim 1, further comprising a display that acts as an electronic viewfinder during composition of each image.

7. The camera assembly of claim 6, wherein the display is on an opposite side of the housing from a side of the housing that retains the reflecting surfaces.

8. The camera assembly of claim 7, further comprising a second camera assembly adjacent the display.

9. The camera assembly of claim 7, further comprising a shutter release button on the side of the housing that retains the reflecting surfaces.

10. The camera assembly of claim 1, further comprising one or more indicators associated with the reflecting surfaces that prompts the user to compose images with specified reflecting surfaces for composition of the panoramic image.

11. The camera assembly of claim 1, wherein the reflecting surfaces are touch sensitive to function as devices for receiving user input regarding which reflecting surface is being used to compose an image.

12. The camera assembly of claim 1, further comprising call circuitry for establishing a call over a network.

13. A camera assembly, comprising:

a sensor that generates digital image data for capturing images, each image representing a portion of a scene that is in a field of view of the camera assembly at the time that the image was captured;

a housing in which the sensor is contained; and a plurality of reflecting surfaces retained by the housing and arranged with respect to each other such that a user of the camera assembly aligns the camera assembly while observing reflections of the scene in each reflecting surface to compose and capture an image corresponding to each reflecting surface so that the captured images, when stitched together to form a panoramic image of the scene, contiguously represents a portion of the scene that includes a representation of the user and is larger than the portion of the scene represented by any one of the captured images; and wherein the reflecting surfaces include a first reflecting surface that is in a plane normal to an optical axis of the camera assembly so that an image field of the camera assembly is generally centered on the user when the user centers the reflection from the first reflecting surface on the user; and wherein the reflecting surfaces include a second reflecting surface that is at an angle to the first reflecting surface so that at least one of rotation or translation of the camera assembly results in the user seeing at least a part of the user in the reflection from the second reflecting surface and so that the field of view of the camera assembly in the rotated or translated position overlaps with the field of view of the camera assembly corresponding to the centered portion associated with the first reflecting surface.

14. The camera assembly of claim 13, further comprising one or more indicators associated with the reflecting surfaces that prompts the user to compose an image with a specified one of the reflecting surfaces.

15. The camera assembly of claim 13, wherein the reflecting surfaces are touch sensitive to function as devices for receiving user input regarding which reflecting surface is being used to compose an image.

* * * * *